US008968893B2

United States Patent
Jang

(10) Patent No.: US 8,968,893 B2
(45) Date of Patent: Mar. 3, 2015

(54) SECONDARY BATTERY

(75) Inventor: Youngcheol Jang, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 685 days.

(21) Appl. No.: 13/251,921

(22) Filed: Oct. 3, 2011

(65) Prior Publication Data

US 2012/0231301 A1 Sep. 13, 2012

Related U.S. Application Data

(60) Provisional application No. 61/451,838, filed on Mar. 11, 2011.

(51) Int. Cl.
| H01M 14/00 | (2006.01) |
| H01M 2/02 | (2006.01) |
| H01M 2/08 | (2006.01) |
| H01M 2/00 | (2006.01) |
| H01M 2/20 | (2006.01) |
| H01M 2/22 | (2006.01) |
| H01M 10/42 | (2006.01) |

(52) U.S. Cl.
CPC ........ *H01M 2/20* (2013.01); *H01M 2/22* (2013.01); *H01M 10/4257* (2013.01); *H01M 2200/106* (2013.01)
USPC ............... 429/7; 429/178; 429/175; 429/163

(58) Field of Classification Search
CPC ...... H01M 2/20; H01M 2/22; H01M 10/4257
USPC ................. 429/7, 61, 178, 175, 163
See application file for complete search history.

(56) References Cited

U.S. PATENT DOCUMENTS

| 2005/0214597 | A1* | 9/2005 | Kim et al. .......... 429/7 |
| 2007/0298287 | A1 | 12/2007 | Tajima et al. |
| 2009/0068501 | A1* | 3/2009 | Hong et al. ......... 429/7 |
| 2009/0086398 | A1* | 4/2009 | Jang ............. 361/106 |
| 2009/0123821 | A1 | 5/2009 | Kim |
| 2009/0305119 | A1 | 12/2009 | Kim |
| 2010/0055560 | A1 | 3/2010 | Jang et al. |
| 2010/0075205 | A1* | 3/2010 | Kwag et al. ......... 429/61 |
| 2010/0136422 | A1 | 6/2010 | Koh et al. |
| 2010/0143788 | A1 | 6/2010 | Koh et al. |

(Continued)

FOREIGN PATENT DOCUMENTS

| EP | 2166595 | 3/2010 |
| JP | 2001-143672 | 5/2001 |

(Continued)

OTHER PUBLICATIONS

Korean Office Action issued on Apr. 22, 2013 in the corresponding Korean Patent Application No. 10-2012-0016628.

(Continued)

*Primary Examiner* — Helen O Conley
(74) *Attorney, Agent, or Firm* — Robert E. Bushnell, Esq.

(57) ABSTRACT

A secondary battery having a compact design by using planar lead plates. In the secondary battery, a third lead plate is arranged on a top side of a protective circuit module, while the first and second lead plates are planar and are arranged on a bottom side of the protective circuit module. Therefore, a coupling height of a bare cell to the protective circuit module can be minimized to allow for an increased capacity of the bare cell. The protective circuit module may include an accommodation portion, such as a groove or a through hole, to accommodate a plug of an electrolyte injection hole in the cap plate.

19 Claims, 3 Drawing Sheets

(56) References Cited

U.S. PATENT DOCUMENTS

| | | |
|---|---|---|
| 2010/0316892 A1 | 12/2010 | Kim |
| 2011/0003180 A1 | 1/2011 | Lee et al. |
| 2011/0008652 A1 | 1/2011 | Lee et al. |
| 2011/0045322 A1 | 2/2011 | Baek et al. |
| 2011/0070465 A1 | 3/2011 | Kim |

FOREIGN PATENT DOCUMENTS

| | | |
|---|---|---|
| KR | 10-2008-0039093 | 5/2008 |
| KR | 10-0851963 | 8/2008 |
| KR | 10-2009-0048854 | 5/2009 |
| KR | 10-2010-0135046 | 12/2010 |
| WO | 2009/025433 A1 | 2/2009 |
| WO | 2009/078584 A1 | 6/2009 |

OTHER PUBLICATIONS

European Office Action issued by the EPO on Jul. 31, 2012 in connection with European Patent Application No. 12156245.8.

* cited by examiner

SECONDARY BATTERY

CLAIM OF PRIORITY

This application claims priority to and the benefit of Provisional Application No. 61/451,838, filed on 11 Mar. 2011, in the U.S. Patent & Trademark Office, the entire content of which is incorporated herein by reference.

BACKGROUND OF THE INVENTION

1. Field of the Invention

Embodiments relate to a design for a secondary battery that reduces a coupling height between a bare cell and a protective circuit module.

2. Description of the Related Art

A secondary battery may include a bare cell and a protective circuit module coupled to the bare cell. The bare cell may include a can accommodating an electrode assembly, the electrode assembly including a separator interposed between a positive electrode plate and a negative electrode plate and a cap assembly sealing the top side of the can. The protective circuit module may include a charge/discharge device and a protective circuit device.

Since protective circuit devices may be disposed on the bottom surface of the protective circuit module, a gap is necessary between the protective circuit module and the bare cell. Therefore, the protective circuit module is supported at the topside of the bare cell by additional lead plates. The lead plates have a bent shape and are electrically conductive to electrically connect the bare cell and the protective circuit module. What is therefore needed is an improved design for a secondary battery that minimizes a coupling height between a bare cell and a protective circuit module.

SUMMARY OF THE INVENTION

An aspect of the present invention provides a secondary battery including planar first and second lead plates to reduce a coupling height between a bare cell and a protective circuit module and thus to allow for an increase in the capacity of the secondary battery by increasing the size of the secondary battery equal to the reduced coupling height.

According to one aspect of the present invention, there is provided a secondary battery that includes a bare cell including an electrode assembly arranged within a can and an electrode terminal, a protective circuit module including a first printed circuit board arranged on top of the bare cell, a first planar lead plate electrically connecting the bare cell to a bottom side of the first printed circuit board and an upper lead plate electrically connecting the electrode terminal to a top side of the first printed circuit board. The first planar lead plate may directly contact the bottom side of the first printed circuit board. The secondary battery may also include a second planar lead plate arranged on a bottom side of the first printed circuit board and at an opposite end of the first printed circuit board from the first planar lead plate. The second planar lead plate may not be electrically connected to the first printed circuit board. The first printed circuit board may be perforated by a first through hole at a location corresponding to the electrode terminal.

The upper lead plate may include a first tab connected to a second tab by a connection part, the connection part may form an angle with each of the first and second tabs. The first tab may be wider than the second tab and may having a greater surface area than the second tab. A portion of the upper lead plate that is arranged on the electrode terminal may be narrower than a portion of the upper lead plate arranged on the top side of the first printed circuit board. The upper lead plate may be planar. A top surface of the electrode terminal may be flush with the top surface of the first printed circuit board.

The bare cell may also include a plug arranged within an electrolyte injection hole, the first printed circuit board may also include an accommodating portion to accommodate the plug. The accommodating portion may be a recess arranged on the bottom side of the first printed circuit board. The accommodating portion may be a second through hole perforating the first printed circuit board.

The secondary battery may also include a printed circuit board type terminal arranged on the top side of the first printed circuit board, the printed circuit board type to terminal may include a second printed circuit board, a positive temperature coefficient (PTC) thermistor arranged within the second printed circuit board and a plurality of external terminals arranged on a top side of the second printed circuit board to electrically connect the bare cell to an external device. The secondary battery may also include a plug arranged within an electrolyte injection hole, the first printed circuit board may be perforated by a through hole to accommodate the plug and an insulation member arranged within the through hole and between the plug and the second printed circuit board. A plurality of protective circuit devices may be arranged on a top side of the first printed circuit board to control a charging operation of the bare cell while preventing an overcharging and an overdischarging of the bare cell.

According to another aspect of the present invention, there is provided a secondary battery that includes a bare cell including an electrode assembly arranged within a can and an electrode terminal, a protective circuit module including a first printed circuit board arranged on top of the bare cell, a first planar lead plate electrically connecting the bare cell to a bottom side of the first printed circuit board, an upper lead plate electrically connecting the electrode terminal to a top side of the first printed circuit board and an insulation film arranged between the bare cell and the first printed circuit board. A thickness of the insulation film may be equal to a thickness of the first planar lead plate.

According to yet another aspect of the present invention, there is provided a secondary battery that includes a bare cell including an electrode assembly arranged within a can and an electrode terminal, the bare cell having an electrolyte injection hole, a protective circuit module including a first printed circuit board arranged on top of the bare cell, a first lead plate electrically connecting the bare cell to a bottom side of the first printed circuit board, an upper lead plate electrically connecting the electrode terminal to a top side of the first printed circuit board; and a plug arranged within the electrolyte injection hole, the first printed circuit board further comprising a recess or a hole to accommodate the plug. The first lead plate may be a planar lead plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Example embodiments will now be described more fully hereinafter with reference to the accompanying drawings, however, they may be embodied in different forms and should not be construed as limiting the present invention to the embodiments set forth herein. Rather, these embodiments are provided so that this disclosure will be thorough and complete, and will fully convey the scope of the disclosure to those skilled in the art.

Hereinafter, a secondary battery will be described with reference to the accompanying drawings according to a first embodiment of the present invention.

Figure 1:
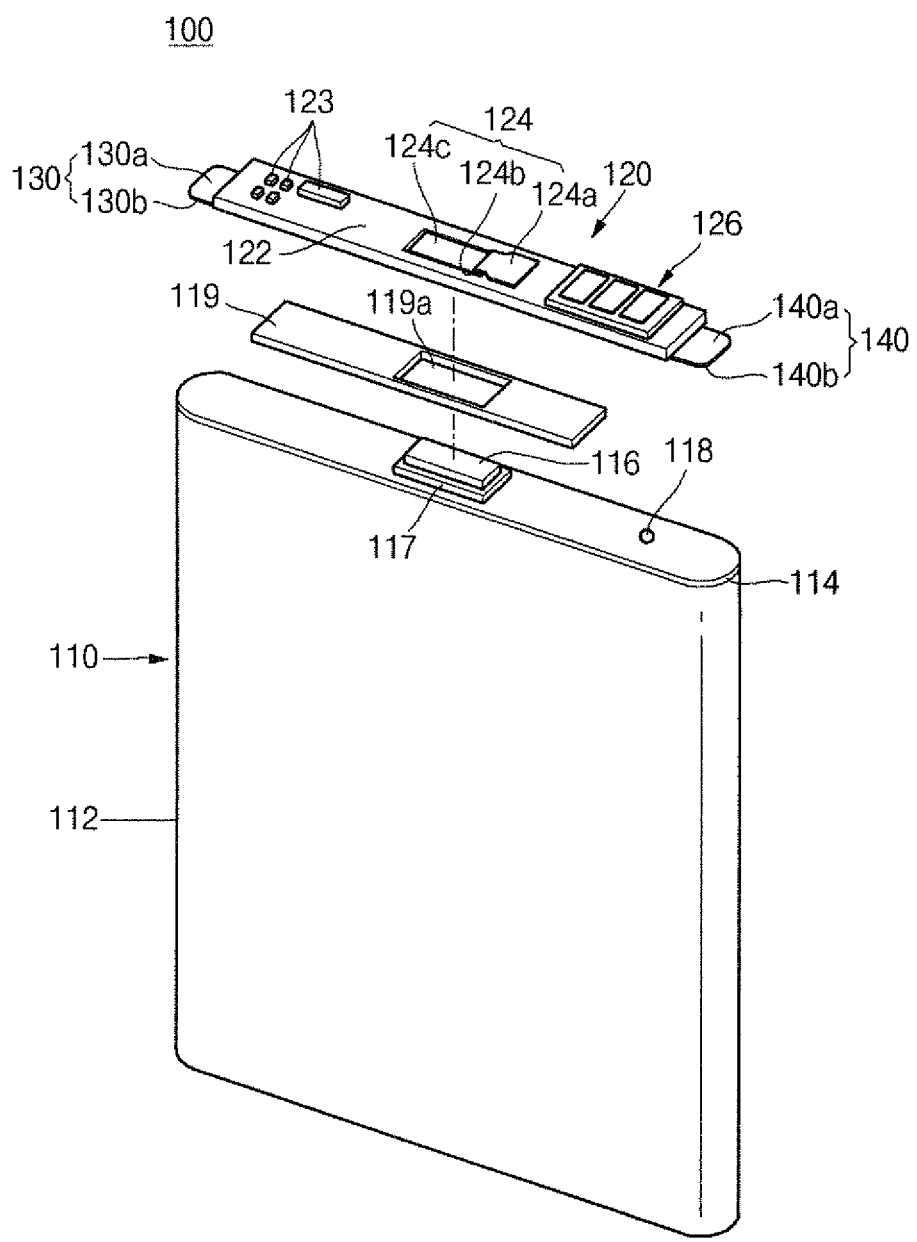
FIG. 1 is an exploded perspective view illustrating a secondary battery according to a first embodiment of the present invention.
Figure 2:
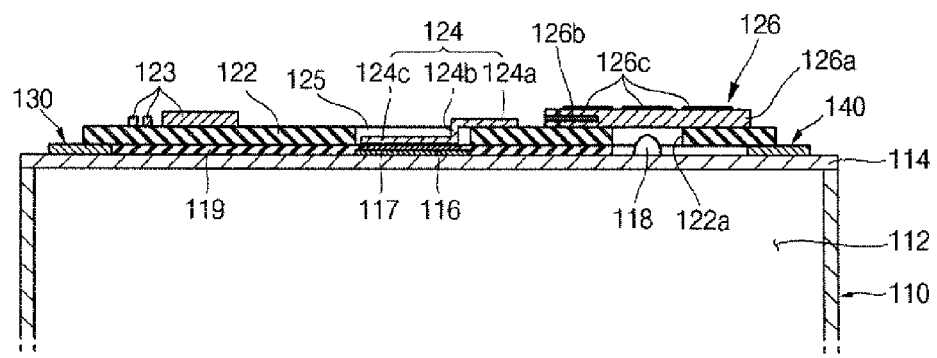
FIG. 2 is a partial side view illustrating the secondary battery according to the first embodiment of the present invention.
Figure 3:
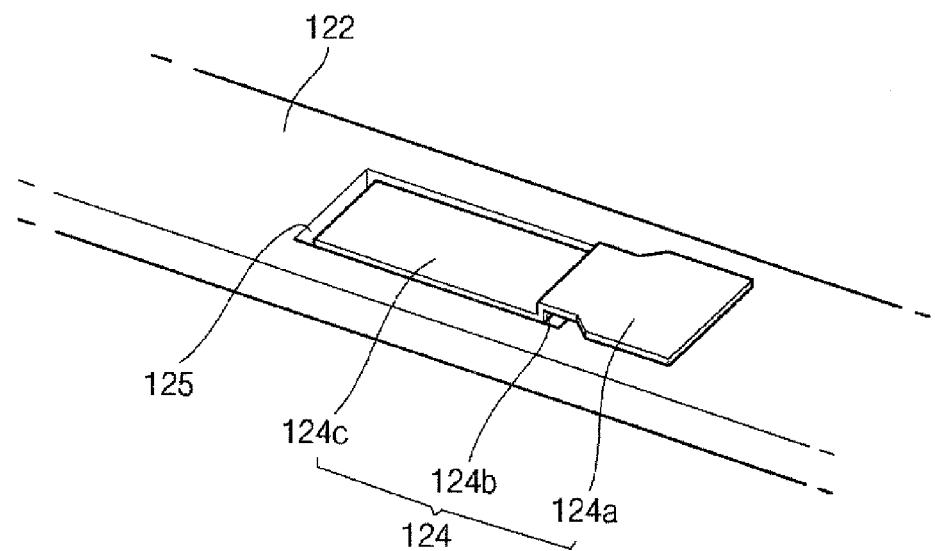
FIG. 3 is a partial enlarged perspective view illustrating a central portion of the protective circuit module including a third lead plate in the secondary battery according to the first embodiment of the present invention.
Figure 4:
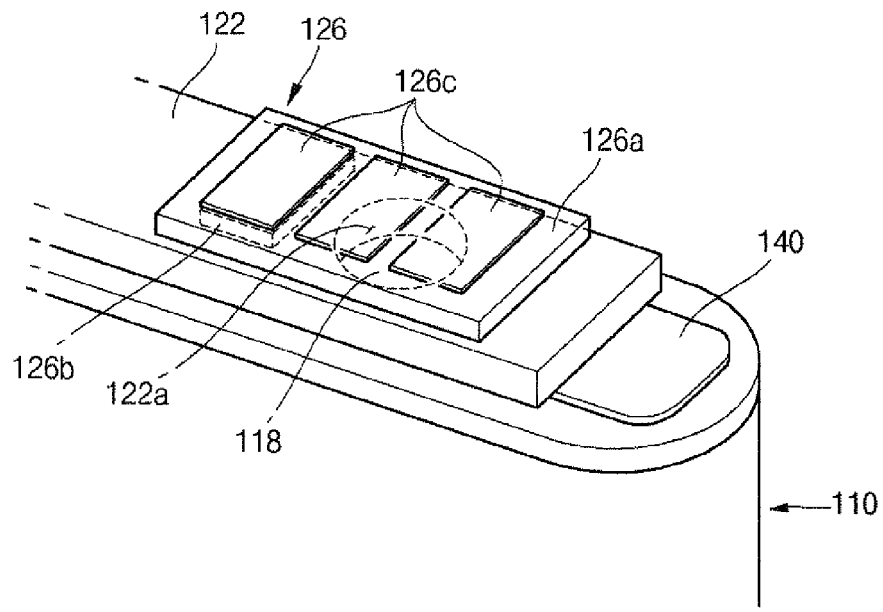
FIG. 4 is a partial enlarged perspective view illustrating a portion of the bare cell and a portion of the protective circuit module that correspond to an electrolyte injection hole plug receiving part in the secondary battery of the embodiments of the present invention.

Turning now to FIGS. 1 through 4, FIG. 1 is an exploded perspective view illustrating a secondary battery 100 according to the first embodiment of the present invention, FIG. 2 is a partial side view illustrating the secondary battery 100 according to the first embodiment of the present invention, FIG. 3 is a partial enlarged perspective view illustrating a protective circuit module 120 including a third lead plate in the secondary battery 100 of the first embodiment of the present invention and FIG. 4 is a partial enlarged perspective view illustrating a bare cell and the protective circuit module including an electrolyte injection hole plug receiving part in the secondary battery 100 of the first embodiment of the present invention.

As shown in FIG. 1, a secondary battery 100 of the first embodiment includes a bare cell 110, a protective circuit module 120, a first lead plate 130, and a second lead plate 140. In addition, the secondary battery 100 may further include a third lead plate 124. The bare cell 110 includes an electrode assembly (not shown), a can 112, a cap plate 114, an electrode terminal 116, a gasket 117, an electrolyte injection hole plug 118, and an insulation film 119. The electrode assembly (not shown) includes a positive electrode plate, a negative electrode plate, and a separator disposed between the positive and the negative electrode plates.

The can 112 may have a rectangular shape or an elliptical shape with rounded corners. The can 112 may be made out of a metallic material. For example, the can 112 may be made out of a light ductile metal such as aluminum or aluminum alloy. The aluminum or aluminum alloy can 112 can be produced by a deep drawing technique. The can 112 provides an inner space in which the electrode assembly (not shown) and electrolyte may be accommodated. The can 112 is electrically connected to a positive tab of the electrode assembly (not shown) so that the can 112 may function as a positive terminal.

The cap plate 114 has an approximately rectangular shape and a size corresponding to an upper opening of the can 112. An insulation plate (not shown) and a terminal plate (not shown) are disposed on the bottom surface of the cap plate 114. Like the can 112, the cap plate 114 may be made out of an electrically conductive metallic material such as aluminum or aluminum alloy. In this case, the cap plate 114 may be coupled to the can 112 by welding the cap plate 114 to the upper opening of the can 112 to seal the can 112. The cap plate 114 may function as a positive electrode or a negative electrode. In the current embodiment, the positive tab of the electrode assembly (not shown) is electrically connected to the cap plate 114 so that the cap plate 114 may function as a positive terminal.

The electrode terminal 116 is disposed at a center part of the cap plate 114. The electrode terminal 116 is electrically connected to a negative tab of the electrode assembly (not shown), and thus the electrode terminal 116 functions as a negative terminal. In the current embodiment, the cap plate 114 functions as a positive terminal, and the electrode terminal 116 functions as a negative terminal, however the polarities may be switched and still be within the scope of the present invention.

The gasket 117 is disposed between the electrode terminal 116 and the cap plate 114 to electrically insulate the electrode terminal 116 from the cap plate 114.

The electrolyte injection hole plug 118 is provided to close an electrolyte injection hole in the cap plate 114 after electrolyte is injected into the can 112 through the electrolyte injection hole. The electrolyte injection hole plug 118 is provided at a top side of the cap plate 114. The electrolyte injection hole plug 118 has a circular shape and has a predetermined size.

Secondary battery 100 also includes an insulation film 119 having a plate shape and being disposed between the cap plate 114 and the printed circuit board 122 of the protective circuit module 120. Insulation film 119 is shorter than the printed circuit board 122. Insulation film 119 may have a thickness equal to that of the first lead plate 130 and may also have a thickness equal to that of the second lead plate 140. When insulation film 119 is of equal thickness to that of both the first and second lead plates 130 and 140, and when both first and second lead plates 130 and 140 are planar, a space-efficient compact connection design results, allowing more room for a higher capacity bare cell. The insulation film 119 includes a terminal penetration hole 119a at a location corresponding to the electrode terminal 116 and the gasket 117. The terminal penetration hole 119a has a rectangular shape such that the electrode terminal 116 and the gasket 117 can protrude therethrough.

The protective circuit module 120 includes the printed circuit board 122, protective circuit devices 123, the third lead plate 124, a receiving part 125, and a printed circuit board type terminal 126. The protective circuit module 120 is disposed above the bare cell 110 and is electrically connected to each electrode of the bare cell 110. The protective circuit module 120 includes the protective circuit devices 123 on a top side of the printed circuit board 122 to control charging and discharging of the bare cell 110 and to prevent overcharging and overdischarging of the bare cell 110.

The printed circuit board 122 has a plate shape. The protective circuit devices 123, the third lead plate 124, and the printed circuit board type terminal 126 are all disposed at the top side of the printed circuit board 122.

An accommodating portion 122a is arranged between the third lead plate 124 and the second lead plate 140 and may be arranged on a bottom side of the printed circuit board 122. The accommodating portion 122a may have a circular shape, an elliptical shape or a rectangular shape. In FIG. 4, the accommodating portion 122a is illustrated as having a circular shape. Electrolyte is not directly injected through the accommodating portion 122a. The accommodating portion 122a has a size corresponding to the size of a protruding portion of the electrolyte injection hole plug 118 and serves to accommodate the protruded part of the electrolyte injection hole plug 118. By including an accommodating portion 122a in printed circuit board 122, a gap between the protective circuit module 120 and the cap plate 114 may be reduced.

The accommodating portion 122a may be groove or recess in the bottom surface of the printed circuit board 122, or may instead be a through hole that perforates printed circuit board 122. If the accommodating portion 122a is a through hole, an additional insulation member may be disposed in the through hole between the electrolyte injection hole plug 118 and the external terminal 126c of printed circuit board type terminal 126 to insulate the external terminal 126c from the injection hole plug 118. In addition, since the printed circuit board type terminal 126 is disposed on the topside of the accommodating portion 122a, electrolyte may not leak through the accommodating portion 122a.

The protective circuit devices 123 are disposed on the top side of the printed circuit board 122 while being arranged between the third lead plate 124 and the first lead plate 130. The protective circuit devices 123 provide a uniform charging process of the bare cell 110 while preventing the bare cell from being overcharged and overdischarged.

The third lead plate 124 includes a first tab 124a, a connection part 124b, and a second tab 124c. The third lead plate 124 is disposed approximately at a center portion of the printed circuit board 122. At least a part of the third lead plate 124 is disposed on the top surface of the printed circuit board 122. The first tab 124a is electrically connected to a negative electrode trace on the top surface of the printed circuit board 122, the second tab 124c is electrically connected to the electrode terminal 116, and the connection part 124b connects the first tab 124a to the second tab 124c.

The first tab 124a extends from the upper end of the connection part 124b, and the second tab 124c extends from the lower end of the connection part 124b in a direction away from the first tab 124a. The first tab 124a may have an area greater than that of the second tab 124c electrically connected to the electrode terminal 116 to provide for a stable electric connection to the protective circuit module 120.

The receiving part 125 is disposed approximately at a center portion of the printed circuit board 122 at a location that corresponds to the electrode terminal. The receiving part 125 may be a hole having an approximately rectangular shape. In the first embodiment, the electrode terminal may be arranged underneath the receiving part 125 or at least a part of the electrode terminal 116 may be inserted within the receiving part 125. The receiving part 125 has a size and depth to allow for at least a part of the electrode terminal 116 to be inserted within the receiving part 125. In the first embodiment of the present invention, the second tab 124c of the third lead plate 124 may also be inserted within the receiving part 125. Therefore, since the second tab 124c of the third lead plate 124 can be accommodated within the receiving part 125, the distance between the printed circuit board 122 and the cap plate 114 can be reduced.

The printed circuit board type terminal 126 includes a printed circuit board 126a, a positive temperature coefficient (PTC) thermistor 126b, and external terminals 126c. The printed circuit board type terminal 126 has an approximately rectangular shape and is disposed between the third lead plate 124 and the second lead plate 140 and covers the accommodating portion 122a. Since the accommodating portion 122a is covered by the printed circuit board type terminal 126, electrolyte within the bare cell 110 is prevented from leaking out through the accommodating portion 122a.

The printed circuit board 126a has an approximately rectangular shape and is disposed on the top surface of the printed circuit board 122. The printed circuit board 126a accommodates the PTC thermistor 126b that is electrically connected to the printed circuit board 122.

The PTC thermistor 126b is disposed within the printed circuit board 126a and is electrically connected to the printed circuit board 122 and to the external terminals 126c. When the secondary battery 100 is heated to a preset temperature or higher due to overcurrent or overvoltage, the PTC thermistor 126b may cut off a current to protect the secondary battery 100 from overheating.

The external terminals 126c are disposed at a top side of the top surface of the printed circuit board 126a which is arranged on a top side of printed circuit board 122. The external terminals 126c are used to electrically connect the printed circuit board 122 to an external electronic device (not shown).

The first lead plate 130 may be made out of nickel. The first lead plate 130 may have a planar plate shape that extends from the printed circuit board 122. The first lead plate 130 includes a first planar surface 130a and a second planar surface 130b opposite from first planar surface 130a. The first planar surface 130a is electrically connected to the protective circuit module 120, and the second planar surface 130b is electrically connected to the cap plate 114. Since the first lead plate 130 is planar, a coupling height between the cap plate 114 and the protective circuit module 120 can be reduced. The first lead plate 130 is coupled to the bottom surface of the protective circuit module 120 by being electrically connected to a positive electrode trace (not shown) on the printed circuit board 122 of the protective circuit module 120. In addition, the first lead plate 130 extends to the top surface of the bare cell 110 to electrically connect the positive electrode of the electrode assembly of the bare cell 110 to the protective circuit module 120. The first lead plate 130 may be connected to the protective circuit module 120 and the bare cell 110 more securely by a weld produced by a laser welding technique.

The second lead plate 140 is disposed on the bottom surface of the printed circuit board 122 and at an opposite end of the printed circuit board 122 from the first lead plate 130. The second lead plate 140 may be coupled to the protective circuit module 120. The first lead plate 130 and the second lead plate 140 may be symmetrical. The second lead plate 140 includes a first planar surface 140a and a second planar surface 140b opposite from the first planar surface 140a. The first planar surface 140a may be electrically connected to the protective circuit module 120, and the second planar surface 140b may be electrically connected to the cap plate 114. Since the second lead plate 140 is planar, the coupling height between the cap plate 114 and the protective circuit module 120 can be minimized.

The second lead plate 140 may serve to improve coupling stability between the bare cell 110 and the protective circuit module 120. The second lead plate 140 may also function as a positive electrode lead plate like the first lead plate 130. Alternatively, the second lead plate 140 may be a dummy lead plate but having a structure corresponding to that of the first lead plate 130. If the second lead plate 140 is a dummy lead plate, the second lead plate 140 is used to maintain the gap between the bare cell 110 and the protective circuit module 120, but is not used to electrically connect the bare cell 110 and the protective circuit module 120. An example of a dummy second lead plate 140 would be a second lead plate 140 being comprised of only an insulating material so that the second lead plate 140 does not electrically connected to the printed circuit board 122. If such a dummy second lead plate 140 is of the same size and shape as the first lead plate 130, such a dummy second lead plate 140 would serve to maintain a gap between the bare cell 110 and the protective circuit module 120 and to keep the protective circuit module 120 parallel to a top side of the bare cell 110.

Regardless whether the second lead plate 140 is a positive electrode lead plate or a dummy lead plate, the second lead plate 140 may have the same shape, size, material, and structure as the first lead plate 130. Owing to the second lead plate 140 and the first lead plate 130, the protective circuit module 120 disposed above the bare cell 110 can be horizontally maintained. In some cases, only the first lead plate 130 may be provided at one end of the protective circuit module 120 by omitting the second lead plate 140. Should the second lead plate 140 be omitted, the secondary battery 100 does not deteriorate because the protective circuit module 120 may be coupled to each electrode of the electrode assembly of the bare cell 110 via the first and third lead plates 130 and 124.

In any scenario, since the first lead plate 130 and the second lead plate 140 disposed between the protective circuit module 120 and the cap plate 114 are planar, a gap or space between the protective circuit module 120 and the cap plate 114 can be minimized to reduce the coupling height between the protective circuit module 120 and the cap plate 114.

Figure 5:
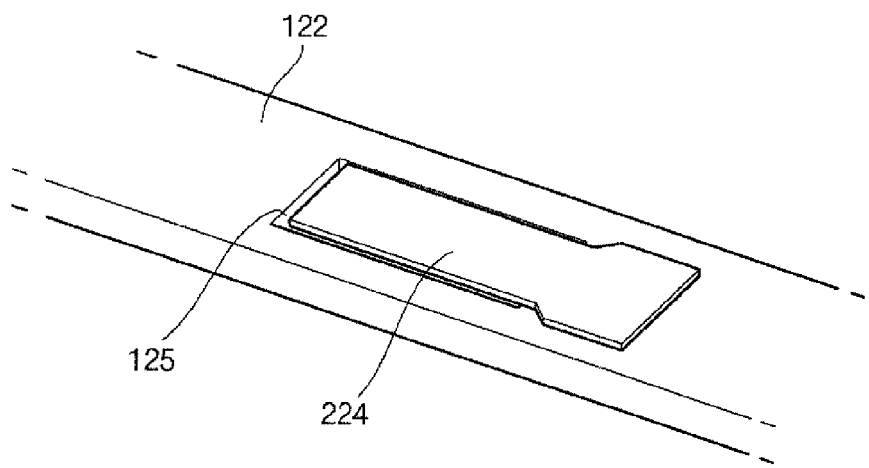
FIG. 5 is an enlarged perspective view illustrating a third lead plate of a secondary battery according to a second embodiment of the present invention.

Hereinafter, an explanation will be given of a secondary battery 200 according to a second embodiment of the present invention. Turning now to FIG. 5, FIG. 5 is an enlarged perspective view illustrating a third lead plate 224 of a secondary battery 200 according to the second embodiment of the present invention.

A secondary battery 200 of the second embodiment of the present invention includes a bare cell 110, a protective circuit module 120, a first lead plate 130, and a second lead plate 140 and the third lead plate 224. The bare cell 110, the protective circuit module 120, the first lead plate 130, and the second lead plate 140 of the secondary battery 200 of the second embodiment are the same as those of the secondary battery 100 of the first embodiment explained with reference to FIGS. 1 to 3. Thus, these elements are denoted by the same reference numerals, and detailed descriptions thereof are not repeated here. Only the third lead plate 224 of the secondary battery 200 of the second embodiment is different from the third lead plate 124 of the secondary battery 100 of the first embodiment described with reference to FIGS. 1 to 3. Therefore, the focus of the following discussion of the second embodiment of the present invention will be on the third lead plate 224.

The third lead plate 224 of the second embodiment may be a planar lead plate shape as shown in FIG. 5. The third lead plate 224 is disposed above receiving part 125. In order to achieve a planar third lead plate 224 design that connects to a negative electrode trace on a top side of a printed circuit board 122, the height of the electrode terminal 116 must be higher than that of the first embodiment, so that the top surface of the electrode terminal 116 in the second embodiment is flush with a top surface of the printed circuit board 122 of protective module 120. When the top surface of the electrode terminal 116 of the second embodiment of the secondary battery 200 is flush with a top surface of the printed circuit board 122, the third lead plate 224 may have a planar design.

According to the embodiments, since the first and second lead plates of the secondary battery are planar, a coupling height between the bare cell and the protective circuit module can be reduced, and thus the capacity of the secondary battery can be increased by increasing the size of the secondary battery by as much as the reduced coupling height.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery, comprising:
   a bare cell including an electrode assembly arranged within a can and an electrode terminal;
   a protective circuit module including a first printed circuit board arranged on top of the bare cell;
   a first planar lead plate electrically connecting the bare cell to a bottom side of the first printed circuit board;
   an upper lead plate electrically connecting the electrode terminal to a top side of the first printed circuit board: and
   a printed circuit board terminal arranged on the top side of the first printed circuit board, wherein the printed circuit board terminal comprises:
   a second printed circuit board;
   a positive temperature coefficient (PTC) thermistor arranged within the second printed circuit board; and
   a plurality of external terminals arranged on a top side of the second printed circuit board to electrically connect the bare cell to an external device.

2. The secondary battery of claim 1, wherein the first planar lead plate directly contacts the bottom side of the first printed circuit board.

3. The secondary battery of claim 1, further comprising a second planar lead plate arranged on a bottom side of the first printed circuit board and at an opposite end of the first printed circuit board from the first planar lead plate.

4. The secondary battery of claim 3, wherein the second planar lead plate is not electrically connected to the first printed circuit board.

5. The secondary battery of claim 1, the first printed circuit board being perforated by a first through hole at a location corresponding to the electrode terminal.

6. The secondary battery of claim 5, the upper lead plate including a first tab being connected to a second tab by a connection part, the connection part forming an angle with each of the first and second tabs.

7. The secondary battery of claim 6, the first tab being wider than the second tab and having a greater surface area than the second tab, wherein the second tab is arranged within the first through hole.

8. The secondary battery of claim 5, a portion of the upper lead plate that is arranged on the electrode terminal being narrower than a portion of the upper lead plate arranged on the top side of the first printed circuit board.

9. The secondary battery of claim 1, the upper lead plate being planar.

10. The secondary battery of claim 9, a top surface of the electrode terminal being flush with the top surface of the first printed circuit board.

11. The secondary battery of claim 1, the bare cell further comprising a plug arranged within an electrolyte injection hole, the first printed circuit board further comprising an accommodating portion to accommodate the plug.

12. The secondary battery of claim 11, the accommodating portion being a recess arranged on the bottom side of the first printed circuit board.

13. The secondary battery of claim 11, the accommodating portion being a second through hole perforating the first printed circuit board.

14. The secondary battery of claim 1, further comprising:
a plug arranged within an electrolyte injection hole, the first printed circuit board being perforated by a through hole to accommodate the plug; and
an insulation member arranged within the through hole and between the plug and the second printed circuit board.

15. The secondary battery of claim 1, further comprising a plurality of protective circuit devices arranged on a top side of the first printed circuit board to control a charging operation of the bare cell while preventing an overcharging and an overdischarging of the bare cell.

16. A secondary battery, comprising:
a bare cell including an electrode assembly arranged within a can and an electrode terminal;
a protective circuit module including a first printed circuit board arranged on top of the bare cell;
a first planar lead plate electrically connecting the bare cell to a bottom side of the first printed circuit board;
an upper lead plate electrically connecting the electrode terminal to a top side of the first printed circuit board;
an insulation film arranged between the bare cell and the first printed circuit board; and
a printed circuit board terminal arranged on the top side of the first printed circuit board, wherein the printed circuit board terminal comprises:
a second printed circuit board;
a positive temperature coefficient (PTC) thermistor arranged within the second printed circuit board; and
a plurality of external terminals arranged on a top side of the second printed circuit board to electrically connect the bare cell to an external device.

17. The secondary battery of claim 16, wherein a thickness of the insulation film is equal to a thickness of the first planar lead plate.

18. A secondary battery, comprising:
a bare cell including an electrode assembly arranged within a can and an electrode terminal, the bare cell having an electrolyte injection hole;
a protective circuit module including a first printed circuit board arranged on top of the bare cell;
a first lead plate electrically connecting the bare cell to a bottom side of the first printed circuit board;
an upper lead plate electrically connecting the electrode terminal to a top side of the first printed circuit board;
a plug arranged within the electrolyte injection hole, the first printed circuit board further comprising a recess or a hole to accommodate the plug: and
a printed circuit board terminal arranged on the top side of the first printed circuit board, wherein the printed circuit board terminal comprises:
a second printed circuit board;
a positive temperature coefficient (PTC) thermistor arranged within the second printed circuit board; and
a plurality of external terminals arranged on a top side of the second printed circuit board to electrically connect the bare cell to an external device.

19. The secondary battery of claim 18, wherein the first lead plate is a planar lead plate.

* * * * *